(12) United States Patent
van Bemmel

(10) Patent No.: US 9,246,812 B2
(45) Date of Patent: Jan. 26, 2016

(54) METHOD AND APPARATUS FOR SELECTING A NEXT HOP

(71) Applicant: Alcatel-Lucent Canada, Inc., Ottawa (CA)

(72) Inventor: Jeroen van Bemmel, Calgary (CA)

(73) Assignee: Alcatel Lucent, Boulogne-Billancourt (FR)

( * ) Notice: Subject to any disclaimer, the term of this patent is extended or adjusted under 35 U.S.C. 154(b) by 98 days.

(21) Appl. No.: 14/255,305

(22) Filed: Apr. 17, 2014

(65) Prior Publication Data

US 2015/0304219 A1    Oct. 22, 2015

(51) Int. Cl.
| | |
|---|---|
| *H04L 12/28* | (2006.01) |
| *H04L 12/743* | (2013.01) |
| *H04L 12/801* | (2013.01) |
| *H04L 12/721* | (2013.01) |

(52) U.S. Cl.
CPC .............. *H04L 45/7453* (2013.01); *H04L 45/72* (2013.01); *H04L 47/17* (2013.01)

(58) Field of Classification Search
USPC ............ 370/392, 351, 389, 395.32, 394, 474, 370/473, 536, 400, 408, 218; 709/242
See application file for complete search history.

(56) References Cited

U.S. PATENT DOCUMENTS

| | | | | |
|---|---|---|---|---|
| 9,036,476 | B2 * | 5/2015 | Grandhi | H04L 47/52 370/235 |
| 2010/0312986 | A1 * | 12/2010 | Fujiwara | H04L 1/0061 711/216 |
| 2012/0230225 | A1 * | 9/2012 | Matthews | H04L 47/125 370/255 |

* cited by examiner

*Primary Examiner* — Chi H Pham
*Assistant Examiner* — Alexander O Boakye
(74) *Attorney, Agent, or Firm* — Kramer & Amado, P.C.

(57) ABSTRACT

Various exemplary embodiments relate to a device for routing an incoming packet to a destination, the device comprising a processor associated with a storage, in communication with a network interface, the processor being configured to receive the incoming packet; access from the storage a plurality of at least two server bits, each server bit representing a possible next hop to the destination, where if the quantity of possible next hops to the destination is less than a power of two then the quantity of server bits is equal to the next highest power of two, and wherein a quantity n is equal to the exponent of the next highest power of two; determine one or more hash bits calculated from a hash value derived from a source address, a destination address, a source port, and a destination port of the packet, wherein the quantity of hash bits is half the number of server bits; and repeatedly, for n repetitions, determine one or more output bits from a plurality of at least two inputs bits and the one or more hash bits, each input bit representing a server bit in the first repetition, the output bits representing half of the remaining possible next hops to the destination, the output bits becoming final output bits in the nth repetition or input bits to a next repetition after the first repetition.

15 Claims, 5 Drawing Sheets

METHOD AND APPARATUS FOR SELECTING A NEXT HOP

TECHNICAL FIELD

Various exemplary embodiments disclosed herein relate generally to selecting a next hop for forwarding an incoming packet, when multiple routing choices are available.

BACKGROUND

Next hop selection is a fundamental part of routing. In one example of a switch setting, multiple links may be built to the same destination for the purposes of redundancy, and then packets are hashed across one of the multiple links, so that if one of the links are lost, other links remain to carry traffic to the destination. A typical edge router may support Equal-Cost Multi-Path (ECMP) routing (defined as an IEEE standard in IEEE 802.1Qbp (part of IEEE_802.1); IETF RFC 2991 discusses multipath routing in general), which is implemented as follows: a hash function is applied to an incoming packet (e.g. based on the 5-tuple of <IP source, IP destination, IP protocol, source port, destination port>) and a modulo N operation is applied to the resulting hash value, where N is the number of equal cost paths available. When the set of paths changes (e.g. because a route is withdrawn), the majority of subsequent packets will hash to a different path, e.g., if the next hop for an address may terminate at different servers on a network, if the number of servers changes then the hash calculation will usually result in a different destination server and application connections will be broken.

For example, if there are two links to choose from link 0 and link 1, and the hash calculation on an address associated with a packet outputs a result ending in 10, the calculation 10 modulo 2 results in 0, and link 0 will be chosen. However, if a new link is added, e.g. link 2, such that there are now three links, if an address associated with the same packet is hashed to the same output ending in 10, the calculation 10 modulo 3 results in 1, and link 1 would be chosen, ultimately resulting in a different path through a different server. For stateful protocols such as TCP, and stateful applications such as SIP, this change results in disruptions to ongoing sessions and the desired efficiency from using ECMP routing is lost.

This type of routing disruption caused by servers joining or leaving the network is particularly problematic in the case of network virtualization. A virtual network consists, at least in part, of virtual network links that do not represent a physical (wired or wireless) connection between two computing devices but is mapped on top of physical infrastructure and implemented using methods of network virtualization. There is typically a more rapid change in the set of paths that exist in a virtual network compared to a physical network, because servers and end points become available and unavailable much more often in a virtual network. One reason for this rapid change is that it is much easier to set up a virtual machine compared to installing a new physical server.

Existing methods use algorithms that only partially ameliorate the problem of disruptions to ongoing sessions, for example, consistent hashing conceptually maps a packet to a virtual bin, and assigns bins to servers in such a way that removing a server affects at most 1/N mappings. However, existing implementations are not suitable for being embedded in a router. Likewise, 'robust hashing' is an algorithm which computes a hash value over the incoming packet and each path in the set; the results are sorted and the path with the highest hash value is selected. This has the same result of affecting at most 1/N mappings upon path changes, however calculating N hashes for each packet is resource-expensive and likewise not easily implemented in routers.

Additionally, prior art hashing algorithms built into Open-VSwitch; for example the 'enum nx_mp_algorithm' (https://github.com/osrg/openvswitch/blob/master/include/openflow/nicira-ext.h), enumerate a number of available options. Although some of the options are listed as 'O(1)', the CPU cycles required for these algorithms are still fairly expensive.

In view of the foregoing, it would be desirable to perform ECMP routing with minimal disruption to existing paths when the path set changes, such that the routing is efficient enough to be embedded in an existing router.

SUMMARY

In light of the present need for ECMP routing with minimal disruption to existing paths that is efficient enough to be embedded in an existing router, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a device for routing an incoming packet to a destination, the device comprising a processor associated with a storage, in communication with a network interface, the processor being configured to receive, via the network interface, the incoming packet; access, from the storage, a plurality of at least two server bits, each server bit representing a possible next hop to the destination, where if the quantity of possible next hops to the destination is less than a power of two then the quantity of server bits is equal to the next highest power of two, wherein a quantity n is equal to the exponent of the next highest power of two; determine one or more hash bits calculated from a hash value derived from a source address, a destination address, a source port, and a destination port of the packet, wherein the quantity of hash bits is half the number of server bits; and repeatedly, for n repetitions, determine one or more output bits from a plurality of at least two inputs bits and the one or more hash bits, each input bit representing a server bit in the first repetition, the output bits representing half of the remaining possible next hops to the destination, the output bits becoming final output bits in the nth repetition or input bits to a next repetition after the first repetition.

In an alternative embodiment, when all next hops are available, the hash inputs distribute requests evenly across all next hops represented by output bits. In another alternative embodiment, the device includes a general purpose CPU, and is further configured to take as inputs a bitmask in a first register, a hash value in the second register, and return the outputs in the first register. In further alternative embodiments, if there are a greater number of server bits than next hops available, when the upper bits representing possible hops evaluate to zero, the server bits that evaluate to zero are discarded until there is a quantity of server bits greater than or equal to the quantity of possible next hops equal to the nearest power of two rounded down. In an alternative embodiment, the quantity n is six and the quantity of server bits is greater than thirty-two and less than or equal to sixty-four.

Various exemplary embodiments relate to a device for routing an incoming packet to a destination, the device comprising a circuit for determining a next hop to a destination, the circuit associated with at least three inputs, the circuit comprising a first inverter receiving a second server input, a second inverter receiving a hash input, a third inverter receiving a first server input, a first OR gate receiving an output from the first and second inverters, a second OR gate receiving the hash input and an output from the third inverter, a first AND gate receiving the first server input and an output from the first OR gate, a second AND gate receiving the second server input and an output from the second OR gate, a first output from the first AND gate, and a second output from the second AND gate.

Various exemplary embodiments relate to a device for routing an incoming packet to a destination, the device comprising at least two circuits for determining a next hop to a destination, the at least two circuits associated with at least six inputs, the circuits comprising a first circuit and a second circuit, each circuit comprising a first inverter receiving a second server input, a second inverter receiving a hash input, a third inverter receiving a first server input, a first OR gate receiving an output from each of the first and second inverters, a second OR gate receiving the hash input and an output from the third inverter, a first AND gate receiving the first server input and an output from the first OR gate, a second AND gate receiving the second server input and an output from the second OR gate, a first output from the first AND gate, and a second output from the second AND gate; a third circuit comprising a first XOR gate receiving the output from the second inverter of the first circuit and the hash input of the second circuit, a second XOR gate receiving the hash input of the first circuit and the hash input of the second circuit a first inverter receiving the outputs from the first and second AND gates of the first circuit, a second inverter receiving the outputs from the first and second AND gates of the second circuit, a first OR gate receiving outputs from each of the first XOR gate and the second inverter, a second OR gate receiving outputs from each of the second XOR gate and the first inverter, a first AND gate receiving the output from the first AND gate of the first circuit and an output of the first OR gate, a second AND gate receiving the outputs from the first OR gate and the second AND gate of the first circuit, a third AND gate receiving the output from the first AND gate of the second circuit and an output from the second OR gate, a fourth AND gate receiving the outputs from the second OR gate and the second AND gate of the second circuit; a first output from the first AND gate; a second output from the second AND gate; a third output from the third AND gate; and a fourth output from the fourth AND gate.

In some alternate embodiments, the third circuit further includes a first diode connected between the second AND gate of the first circuit and the first inverter of the third circuit, and a second diode connected between the first AND gate of the second circuit and the second inverter of the third circuit. In some alternative embodiments, the third circuit further includes a third OR gate connected between the first and second AND gates of the first circuit and the first inverter of the third circuit, and a fourth OR gate connected between the first and second AND gates of the second circuit and the second inverter of the third circuit.

Various exemplary embodiments relate to a device for routing an incoming packet to a destination, the device including at least one circuit for determining a next hop to a destination, the at least one circuit associated with at least three inputs, the device including an input circuit block with three inputs, the input circuit block configured to: receive a first server input and a second server input, each server input representing a possible next hop to the destination; receive one hash input; and determine a server output for each server input, where when both server inputs are negative, both server outputs are negative; when one server input is negative and the other server input is positive, the server output corresponding to each server input matches the state of that input; and when both server inputs are positive, determine that one server output is negative and one server output is positive based upon the state of the hash bit, where the server outputs reverse polarity depending upon the polarity of the hash input.

In some alternate embodiments, the device is further configured so when all server inputs are positive, toggling the hash input distributes positive outputs evenly across server outputs. In some embodiments, the device further includes at least one decision block including a circuit configured to receive the server outputs and the hash inputs from two input circuit blocks, and configured to: determine a server output for each input circuit block server output and all hash inputs, where zero or one server output from each input circuit block can be positive, and the server outputs represent half the remaining positive input circuit block server outputs. In some alternative embodiments, the device is further configured so that when all server inputs to the input circuit blocks are positive, all logical binary combinations of the hash inputs will distribute positive input circuit block server inputs evenly across decision block server outputs.

In some embodiments, the device further includes at least one output block including a circuit configured to receive the server outputs and hash inputs from at least two intermediate blocks, where the quantity of intermediate blocks is equal to a power of two, the at least two intermediate blocks including at least two decision blocks or at least two output blocks; the output block configured to: determine an output block server output for each received server output and all received hash inputs, where the output block server outputs represent half the remaining positive intermediate block server outputs. In some alternative embodiments, the device is further configured so that when all server inputs to the input circuit blocks are positive, all logical binary combinations of the hash inputs will distribute positive input circuit block server inputs evenly across output block server outputs.

BRIEF DESCRIPTION OF THE DRAWINGS

In order to better understand various exemplary embodiments, reference is made to the accompanying drawings, wherein.

DETAILED DESCRIPTION

Figure 1:
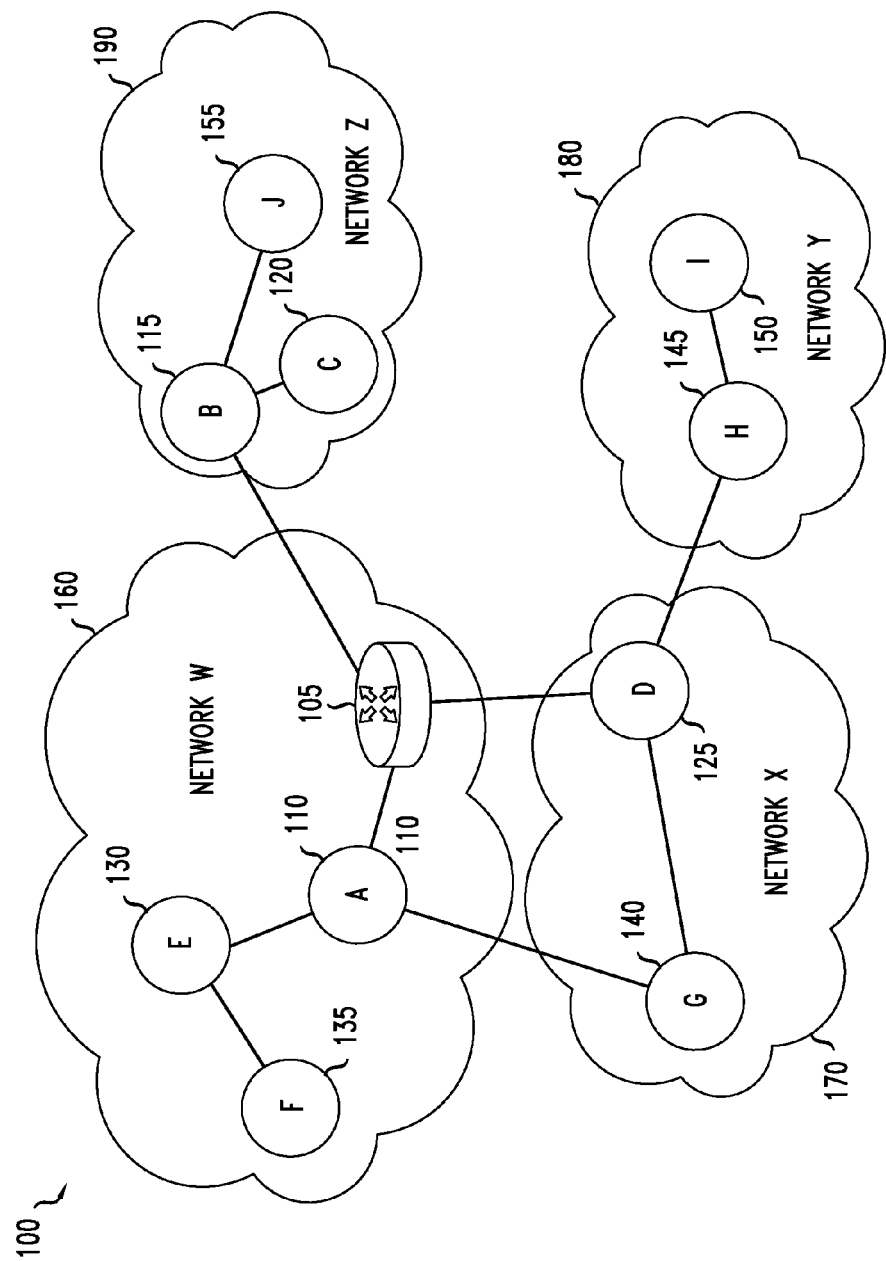
FIG. 1 illustrates the topology of an exemplary network.

It is preferable that in a network where servers and routes are constantly being added and deleted, a resource efficient method exists of selecting a path towards a destination where if the options for selecting a next hop changes, only a limited subset of the routing flows change rather than all of the flows.

Referring now to the drawings, in which like numerals refer to like components or steps, there are disclosed broad aspects of various exemplary embodiments.

FIG. 1 illustrates the topology of an exemplary network 100. Exemplary network 100 may include the Internet, a carrier network, and/or any other type of network, including, for example, a virtual network. Exemplary network 100 may include numerous additional devices (not shown), including additional devices providing connectivity between the devices illustrated. For example, one or more layer 2 and/or layer 3 devices may provide connectivity between router 105 and gateway device 110.

Exemplary network 100 may include router 105. Router 105 may be any device capable of routing packets to a next hop in the path between the source and destination in a distributed network of devices. More specifically, in various exemplary embodiments, router 105 may be a server, blade, router, or any other device capable of communicating with other devices.

Router node 105 may be directly connected to one or more gateway devices A-D 110-125 (next hop) along the path to the final network destination. As noted above, this direct connection may include one or more additional devices. The gateway devices A-D 110-125 may be considered to be directly connected to router 105 because router 105 may transmit a packet to any of these gateway devices A-D 110-125 without the packet being forwarded by an intermediate device. In other words, each of the gateway devices A-D 110-125 may be a "next hop" device for router 105.

Exemplary network 100 may also include a number of additional devices E-J 130-155 that are not directly connected to the router 105. Instead, devices E-J 130-155 may be in communication with router 105 via one or more intermediate nodes such as, for example, one of gateway devices A-D 110-125. For example, device F 135 may be in communication with router 105 via two intermediate gateways: device E 130 and device A 110.

Collectively, devices A-J 110-155 may each communicate according to a routing protocol and may each be a server, blade, router, personal or laptop computer, or any other device capable of communicating with other devices. Each device A-J 110-155 may perform a different function within their respective networks, or within a virtual network. Various types of devices that may communicate according to one or more routing protocols will be apparent to those of skill in the art.

Each device 105-155 of exemplary network 100 may belong to its own network or sub-network of connected devices. As illustrated, router 105, device A 110, device E 130, and device F 135 may belong to Network W 160; device D 125 and device G 140 may belong to Network X 170; device H 145 and device I 150 may belong to Network Y 180; and device B 115, device C 120, and device J 155 may belong to Network Z 190.

When sending a packet to another device A-J 110-155, router 105 may direct the packet to a next hop towards the resident network of the destination device. For example, router 105 may forward packets destined for Network Y 180 to gateway device D 125 as a next hop. Device D 125 may, in turn, forward the packets to device H 145. Router 105 may also route packets based on the application with which the packets are associated. For example, router 105 may route a packet destined for device G 140 to either device A 110 or device D 125, depending on the application with which the packet is associated.

Exemplary network 100 may have a dynamic topology. Various devices A-J 110-155 may exit the network or change the devices to which they are connected. For example, device F 135 may go offline, thereby exiting the network, while device J 155 may move such that device J 155 is no longer connected to device B 115 and is instead in direct communication with device I 150. Further, additional devices (not shown) may enter the network. Router 105 may be adapted to determine when devices, such as devices A-D 110-125, have connected or disconnected from router 105. Various methods for determining whether a device has connected to or disconnected from router 105 will be apparent to those of skill in the art.

Figure 2:
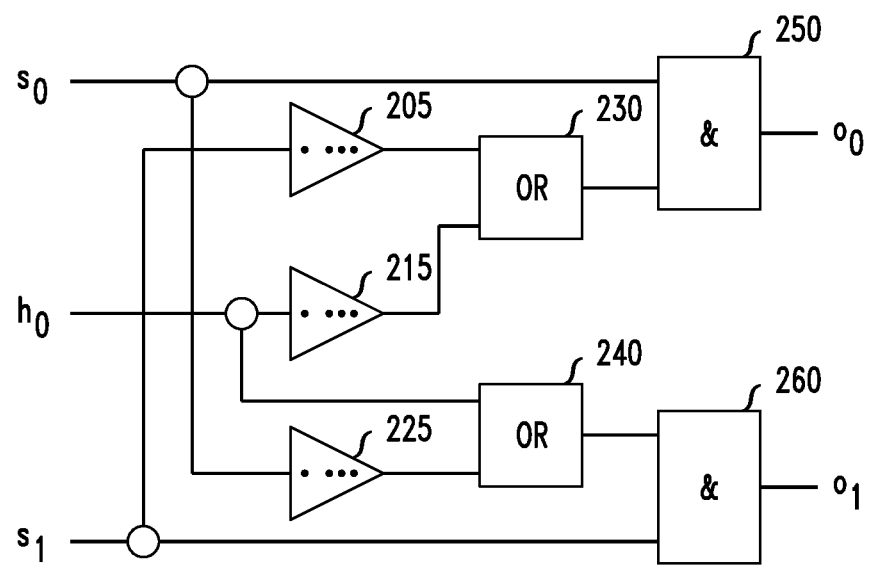
FIG. 2 illustrates an exemplary selection circuit to select between two servers.

FIG. 2 demonstrates an exemplary basic server selection circuit to choose between 2 servers $S_0$ and $S_1$. Two input bits ($S_0$ and $S_1$) represent each server that may be available for a next hop, with $S_0=1$ when server 0 is available for selection and $S_1=1$ when server 1 is available for selection. For example, server 0 may represent device B 115, and server 1 may represent device C 120. In this example, an input $h_0$ is a bit taken from the hash value previously calculated for an incoming packet, which may be based upon source address, destination address, source port, and destination port so that the same hash value will result for packets that belong to the same flow. If both servers are available (i.e. $S_0=1$ and $S_1=1$), output $O_0$ representing a choice of server 0 will be true if and only if the hash value does not equal 1 (iff $!h_0==1$, i.e. $h_0==0$) and output $O_1$ representing a choice of server 1 will be true if and only if the hash value equals 1 (iff $h_0==1$). Consequently, either output $O_0$ or output $O_1$ will be active, but never both. Extending the circuit to n servers, at most 1 bit will be set for O[0 ... n], where this bit selects the server or path to forward the packet to (i.e. the next hop when routing).

In the exemplary circuit shown in FIG. 2, if server 1 goes down and the path to server 1 is withdrawn, and hence $S_1=0$, a packet which previously hashed to a value where the single-bit hash value $h_0=0$ will still be forwarded to server 0 (i.e. $h_0=0$ and $S_0=1 \Rightarrow O_0=1$). A packet that hashed to a value where the single-bit hash value $h_0=1$ would normally go to server 1, but because the value representing server 1 is set to false, $S_1=0$, due to the negated 105 OR 130 the output $O_0$ is now 1, and hence server 0 is selected instead of server 1.

Likewise, if server 0 goes down and the path to server 0 is withdrawn, and hence $s_0=0$, a packet which previously hashed to a value where the single-bit hash value $h_0=1$ will still be forwarded to server 1 (i.e. $h_0=1$ and $S_1=1 \Rightarrow O_1=1$). A packet that hashed to a value where the single-bit hash value $h_0=0$ would normally go to server 0, but because the value representing server 0 is set to false, $s_0=0$, due to the negated 125 OR 140 the output $O_1$ is now 1, and hence server 1 is selected instead of server 0.

A logic table representing the output of the arrangement of server input bits $S_0$ and $S_1$, hash value bit $h_0$, inverters 205, 215, and 225, OR gates 230 and 240, and AND gates 250 and 260, demonstrates the potential outputs $O_0$ and $O_1$ of the exemplary server selection circuit of FIG. 2:

| $S_0$ | $S_1$ | $h_0$ | $O_0$ | $O_1$ |
|---|---|---|---|---|
| 0 | 0 | 0 | 0 | 0 |
| 0 | 0 | 1 | 0 | 0 |
| 0 | 1 | 0 | 0 | 1 |
| 0 | 1 | 1 | 0 | 1 |
| 1 | 0 | 0 | 1 | 0 |
| 1 | 0 | 1 | 1 | 0 |
| 1 | 1 | 0 | 1 | 0 |
| 1 | 1 | 1 | 0 | 1 |

Figure 3:
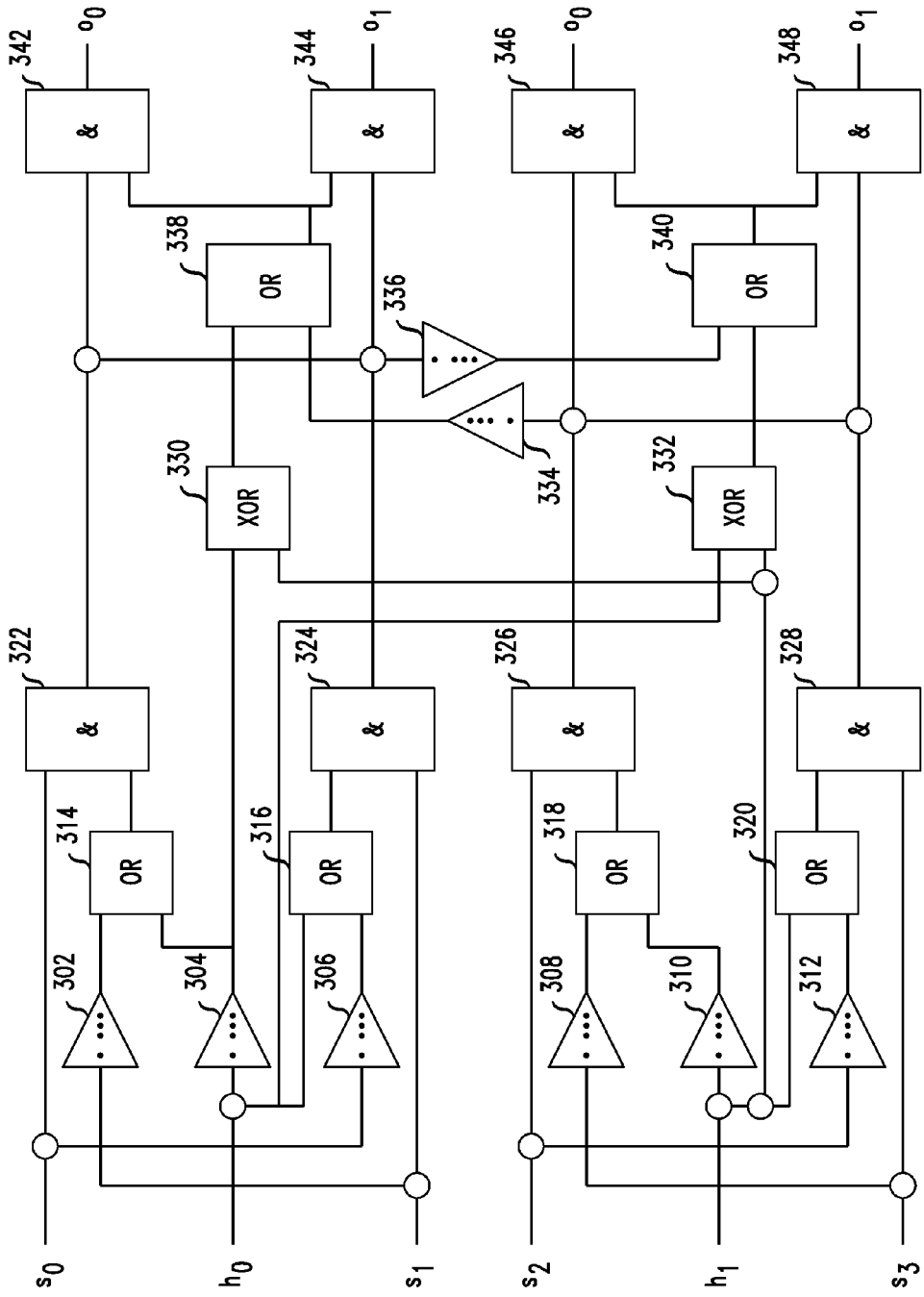
FIG. 3 illustrates an exemplary selection circuit to select between four servers.

Those skilled in the art will appreciate that the simple circuit in FIG. 2 can be extended to support selection across more servers. For example, FIG. 3 shows a circuit to select between four servers, where the additional transistors and/or chip resources to implement such an extension would be negligible (e.g., the sample circuit illustrated by FIG. 3 uses only 8 inverters, 6 OR gates, 2 XOR gates, and 8 AND gates to select amongst four servers). A logic table representing the output of the arrangement of server input bits $S_0$, $S_1$, $S_2$, and $S_3$; hash value bits $h_0$ and $h_1$; wired connections 350, 352, 354, and 356; inverters 302, 304, 308, 308, 310, 312, 334, and 336; OR gates 314, 316, 318, 320, 338, and 340; AND gates 322, 324, 326, 328, 342, 344, 346, and 348; and XOR gates 330 and 332 demonstrates that when all servers are available, the hash inputs distribute requests evenly across all servers represented by potential outputs $O_0$, $O_1$, $O_2$ and $O_3$ of the exemplary server selection circuit of FIG. 3:

| $S_0$ | $S_1$ | $S_2$ | $S_3$ | $h_0$ | $h_1$ | $O_0$ | $O_1$ | $O_2$ | $O_3$ |
|---|---|---|---|---|---|---|---|---|---|
| 1 | 1 | 1 | 1 | 0 | 0 | 1 | | | |
| 1 | 1 | 1 | 1 | 0 | 1 | | | | 1 |
| 1 | 1 | 1 | 1 | 1 | 0 | | | 1 | |
| 1 | 1 | 1 | 1 | 1 | 1 | | 1 | | |

Figure 4:
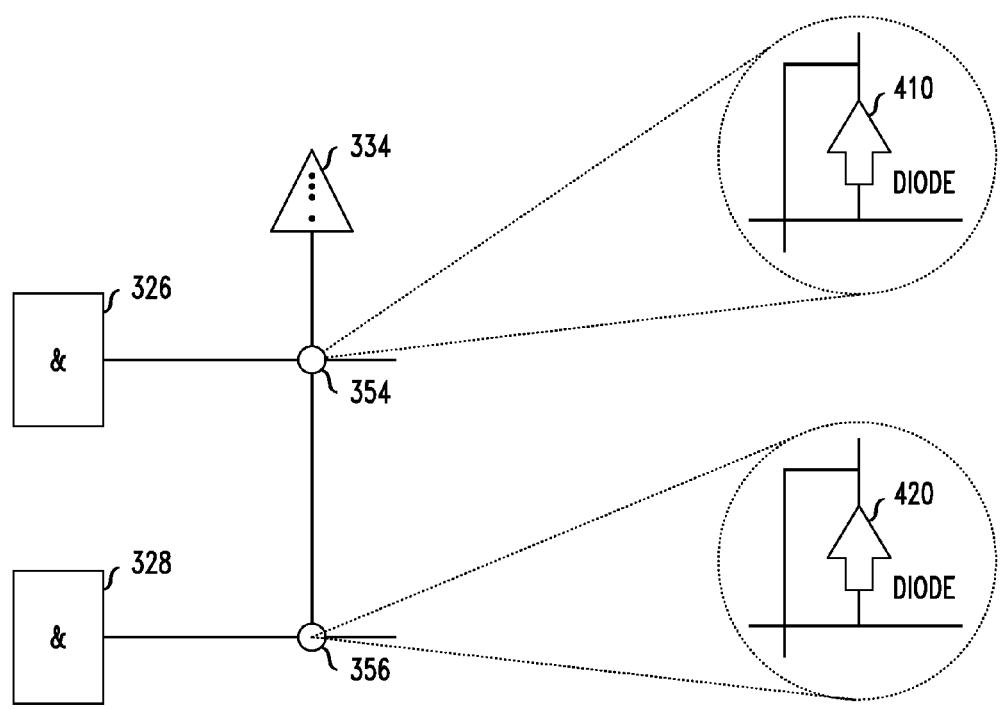
FIG. 4 illustrates an wired OR arrangement in an exemplary selection circuit.

Those skilled in the art will appreciate that wired connections 350, 352, 354, and 356 of the circuit of FIG. 3 may include wired or connections between AND gates 322, 324, 326, 328 and inverters 334 and 336 such that if either AND gate 322 or AND gate 324 is logical 1, inverter 336 will be logical 1, and if either AND gate 326 or AND gate 328 is logical 1, inverter 334 will be logical 1. This arrangement may require care to avoid that, for example, when AND gate 328 is logical 1 and AND gate 326 is logical 0, the top input of the AND gate 344 O1 becomes logical 1 because of the logical 0 output of the AND gate 326. As shown in FIG. 4, avoiding such an unintended result can typically be achieved with diodes 410 and 420 in the paths between AND gates 326 and 328 and inverter 334; a similar arrangement would apply to the paths between AND gates 322 and 324 and inverter 336. As is known in the art, in such a "wired or" gate arrangement, a pull-down resistor may be used to force a output logical 0 in case none of the inputs are asserted. A person of skill in the art would recognize that the same logic could be realized using conventional OR gates.

In an exemplary embodiment, the illustrated circuits or a similar circuit of up to 64 bits could be added to a CPU such that a CPU assembler instruction may be used, for example, an Intel style instruction SELECT reg64, reg64 which would take as inputs a bitmask in the first register argument and a hash value in the second, and return the outputs $O_0 \ldots O_{63}$ in the first register. The exemplary circuits and similar circuits allowing outputs $O_0$ to $O_n$ up to a usably large number would in most cases allow the instruction to be executed in a single clock cycle—in theory the instructions of the method disclosed here would require O(log 2(n_links)) time, however the number of instructions is very low.

In another exemplary embodiment, code closely emulating a hardware circuit resembling those illustrated by FIGS. 2 and 3 may choose one server out of up to eight possible next hops by selecting 1 out of 8 bits in 3 parallel rounds. In each round, available servers are paired and a hash input is used to break ties. When eight servers are available, this method selects 4, then 2 and finally 1 server.

An exemplary embodiment of such a circuit emulator is shown below. In this embodiment a pair-wise elimination of candidate servers is performed where in each round one of 2 bits is selected, each bit representing half of the remaining potential next hops from the beginning or from the previous round. The exemplary code selects between up to 8 active servers represented by 8 bits; in the first round, the 'even' servers are pitted against the 'odd' servers by masking with an eight-bit mask represented by hexadecimal 0x55 (binary 01010101, which selects servers 0, 2, 4, and 6) and 0xaa (binary 10101010, which selects servers 1, 3, 5, and 7). When the 'odd' server corresponding to an 'even' server is down, or when the hash bit for the pair is 0 (even), an 'even' server is selected. Likewise, an 'odd' server is selected when the corresponding 'even' server is down (0), or when the hash bit for the pair is 1 (odd).

After the first round, up to four servers remain selected. These four servers are reduced to two by a second round of elimination, this time pitting pairs of servers against each other, either 0 or 1 against 2 or 3, and 4 or 5 against 6 or 7). This process continues until exactly 1 server remains selected, represented by a single output bit (or, in the case where no servers are available, an error is returned).

This exemplary embodiment (shown for purposes of the example in C code below), translates to 65 assembler instructions using GCC, and most are simple operations which will typically execute in a single clock cycle (or less). Those skilled in the art will understand that this example can be extended to support more bits, for example on x86_64 CPUs like Intel Pentium 4 a 64-bit version can be written using 6 instead of 3 rounds (using roughly 150 instructions or less). In this exemplary embodiment no dynamic memory or memory references are used, resulting in extremely fast execution from cache with no variable delays due to memory access.

```
/**
 * Returns a target server based on a consistent hash mapping, without using a servermap
 * 8-bit version
 * @param active Bitmask of active servers / path entries to choose from
 * @param hash Input value to break ties; only 7 bits are used
 */
server_id_t consistentHash8( unsigned char active, unsigned char hash )
{
    if (!active) {
        fprintf( stderr, "Warning: No active servers!\n" );
        return 0;
    }
    // For 8 bits: Do 3 rounds of elections, using the hash input to resolve ties
    unsigned char others = ((active&0x55)<<1) | ((active&0xaa)>>1); // A->B B->A
    unsigned char h1t = (hash&0xaa);                // 7-5-3-1-
    h1t |= h1t>>1;                                  // 77553311
    unsigned char h = h1t ^ 0x55;                   // 7^5^3^1^
    active &= ~others | h;
    unsigned char others2 = active | ((active&0x55)<<1) | ((active&0xaa)>>1); // A->A|B B->B|A
    others2 = ((others2&0x33)<<2) | ((others2&0xcc)>>2); // A-> C|D   B-> C|D C -> A|B
    unsigned char h2t = (hash&0x44);                // -6---2--
```

-continued

```
    h2t | = h2t<<1;                                           // 66--22--
    h2t | = h2t>>2;                                           // 66662222
    unsigned char h2 = h2t^0xcc;                              // ^^66^^22
    active &= ~others2 | h2;
    unsigned char others3 = active | ((active&0x55)<<1) | ((active&0xaa)>>1); // A->A|B B->B|A
    others3 | = ((others3&0x33)<<2) | ((others3&0xcc)>>2);    // A->A|B|C|D B->A|B|C|D ...
    others3 = ((others3&0x0f)<<4) | ((others3&0xf0)>>4);      // A-> E|F|G|H  B-> E|F|G|H
    unsigned char h3t = (hash&0x01);                          // --------0
    --h3t;                                                    // ~0~0~0~0~0~0~0~0
    unsigned char h3 = h3t^0xF0;                              // ^^^^0000
    active &= ~others3 | h3;
    assert( active!=0 );
    assert( __builtin_popcount(active) == 1 );
    server_id_t r = __builtin_ffsl(active) - 1;
    assert( active & (1UL<<r) );
    return r;
}
```

Those skilled in the art will appreciate that this method, which in each round chooses between half the possible next hops, can be applied to any number of servers that is a power of 2 (e.g. 64 servers, 128 servers, etc.). The number of servers that must be supported depends on the routing application, and may be aligned with the register size supported by the CPU architecture (e.g. 64 bits for Intel x86-64 processors). In this way, SIMD (Single Instruction Multiple Data) principles can be applied to implement the calculation efficiently, for example, in a single clock cycle as described above.

It may also be understood by one of skill in the art that because the set of servers to choose from is typically much smaller than the full size of the supported set, one can eliminate certain rounds of calculation, rendering the method described herein even more efficient. For example, if the method assumes 64-bit masks to represent the set of servers (e.g., 64 servers, but a given application only uses up to 8 servers, the calculation may be "short-cut" by testing if the upper 56 bits (64−8=56) are 0, and if so eliminate the three reduction rounds requiring 64, 32, and 16 bits, and proceed with the reduction rounds commencing with the 8-bit algorithm instead (leaving three reduction rounds from 8 bits to 4 to 2 to 1, instead of the 64-bit algorithm requiring six reduction rounds).

Figure 5:
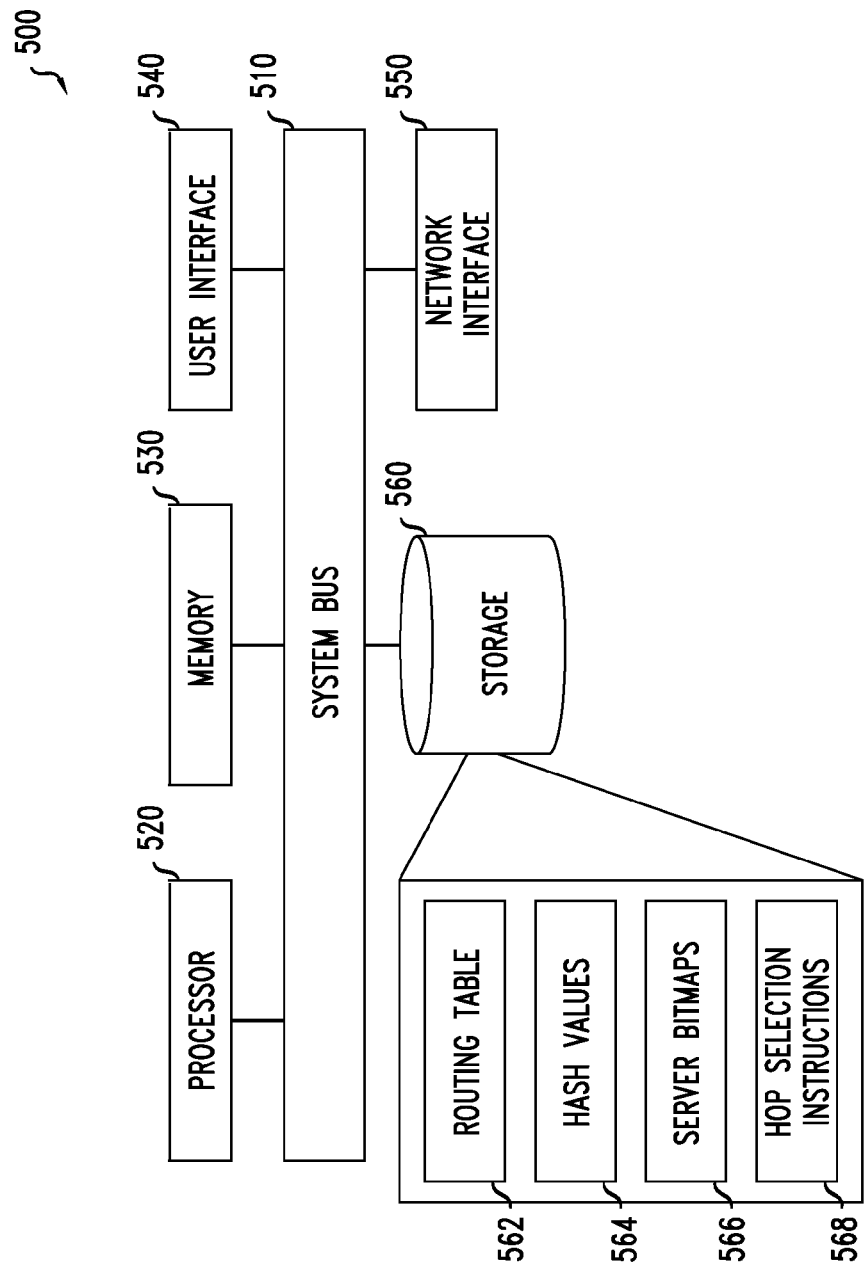
FIG. 5 illustrates an exemplary hardware diagram of a router or a network device.

FIG. 5 illustrates an exemplary hardware diagram 500 for implementing a router or a network device. The hardware diagram 500 may correspond to the router 105 or one or more devices A-J 110-155 of the exemplary network 100. As shown, the hardware device 500 includes a processor 520, memory 530, user interface 540, network interface 550, and storage 560 interconnected via one or more system buses 510. It will be understood that FIG. 5 constitutes, in some respects, an abstraction and that the actual organization of the components of the hardware device 500 may be more complex than illustrated.

The processor 520 may be any hardware device capable of executing instructions stored in memory 530 or storage 560. As such, the processor may include a microprocessor, field programmable gate array (FPGA), application-specific integrated circuit (ASIC), or other similar devices. The processor 520 may include the server selection circuits of FIG. 2, FIG. 3, or a similar circuit extended to support selection across more servers. Various alternative or additional hardware or configurations for the processor 520 will be apparent.

The memory 530 may include various memories such as, for example L1, L2, or L3 cache or system memory. As such, the memory 530 may include static random access memory (SRAM), dynamic RAM (DRAM), flash memory, read only memory (ROM), or other similar memory devices.

The user interface 540 may include one or more devices for enabling communication with a user such as an administrator. For example, the user interface 540 may include a display, a mouse, and a keyboard for receiving user commands.

The network interface 550 may include one or more devices for enabling communication with other hardware devices. For example, the network interface 550 may include a network interface card (NIC) configured to communicate according to the Ethernet protocol. Additionally, the network interface 550 may implement a TCP/IP stack for communication according to the TCP/IP protocols. Various alternative or additional hardware or configurations for the network interface 550 will be apparent.

The storage 560 may include one or more machine-readable storage media such as read-only memory (ROM), random-access memory (RAM), magnetic disk storage media, optical storage media, flash-memory devices, or similar storage media. In various embodiments, the storage 560 may store instructions for execution by the processor 520 or data upon with the processor 520 may operate. For example, when the hardware device 500 is a router 105, the storage 560 may store hop selection instructions 568 for selecting a next path in routing table 562 using hash bits from hash values 564 and server bitmaps 566. Various other modifications will be apparent.

It will be apparent that various information described as stored in the storage 560 may be additionally or alternatively stored in the memory 530. For example, the server bitmaps 566 may be stored, at least partially, in memory 530 for use by the processor 520. In this respect, both the memory 530 and the storage 560 may also be considered to constitute "memory devices." Various other arrangements will be apparent. Further, the memory 530 and storage 560 may both be considered to be "non-transitory machine-readable media." As used herein, the term "non-transitory" will be understood to exclude transitory signals but to include all forms of storage, including both volatile and non-volatile memories.

While the hardware device 500 is shown as including one of each described component, the various components may be duplicated in various embodiments. For example, the processor 520 may include multiple microprocessors that are configured to independently execute the methods described herein or are configured to perform steps or subroutines of the methods described herein such that the multiple processors cooperate to achieve the functionality described herein. In some embodiments, such as those wherein the hardware device 500 is implemented in a cloud computing architecture, components may be physically distributed among different devices. For example, the processor 520 may include a first microprocessor in a first data center and a second microprocessor in a second data center. Various other arrangements will be apparent.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A device for routing an incoming packet to a destination, the device comprising a processor associated with a storage, in communication with a network interface, the processor being configured to:
   receive, via the network interface, the incoming packet;
   access, from the storage, a plurality of at least two server bits, each server bit representing a possible next hop to the destination, where if the quantity of possible next hops to the destination is less than a power of two then the quantity of server bits is equal to the next highest power of two, wherein a quantity n is equal to the exponent of the next highest power of two;
   determine one or more hash bits calculated from a hash value derived from a source address, a destination address, a source port, and a destination port of the packet, wherein the quantity of hash bits is half the number of server bits; and
   repeatedly, for n repetitions, determine one or more output bits from a plurality of at least two inputs bits and the one or more hash bits, each input bit representing a server bit in the first repetition, the output bits representing half of the remaining possible next hops to the destination, the output bits becoming final output bits in the nth repetition or input bits to a next repetition after the first repetition.

2. The device of claim 1, wherein when all next hops are available, the hash inputs distribute requests evenly across all next hops represented by output bits.

3. The device of claim 1, wherein the device is a general purpose CPU, and is further configured to take as inputs a bitmask in a first register, a hash value in the second register, and return the outputs in the first register.

4. The device of claim 1, wherein if there are a greater number of server bits than next hops available, when the upper bits representing possible hops evaluate to zero, the server bits that evaluate to zero are discarded until there is a quantity of server bits greater than or equal to the quantity of possible next hops equal to the nearest power of two rounded down.

5. The device of claim 1, wherein the quantity n is six and the quantity of server bits is greater than thirty-two and less than or equal to sixty-four.

6. A device for routing an incoming packet to a destination, the device comprising a circuit for determining a next hop to a destination, the circuit associated with at least three inputs, the circuit comprising:
   a first inverter receiving a second server input;
   a second inverter receiving a hash input;
   a third inverter receiving a first server input;
   a first OR gate receiving an output from the first and second inverters;
   a second OR gate receiving the hash input and an output from the third inverter;
   a first AND gate receiving the first server input and an output from the first OR gate;
   a second AND gate receiving the second server input and an output from the second OR gate;
   a first output from the first AND gate; and
   a second output from the second AND gate.

7. A device for routing an incoming packet to a destination, the device comprising at least two circuits for determining a next hop to a destination, the at least two circuits associated with at least six inputs, the circuits comprising:
   a first circuit and a second circuit, each circuit comprising
      a first inverter receiving a second server input;
      a second inverter receiving a hash input;
      a third inverter receiving a first server input;
      a first OR gate receiving an output from each of the first and second inverters;
      a second OR gate receiving the hash input and an output from the third inverter;
      a first AND gate receiving the first server input and an output from the first OR gate;
      a second AND gate receiving the second server input and an output from the second OR gate;
      a first output from the first AND gate; and
      a second output from the second AND gate;
   a third circuit comprising
      a first XOR gate receiving the output from the second inverter of the first circuit and the hash input of the second circuit;
      a second XOR gate receiving the hash input of the first circuit and the hash input of the second circuit;
      a first inverter receiving the outputs from the first and second AND gates of the first circuit;
      a second inverter receiving the outputs from the first and second AND gates of the second circuit;
      a first OR gate receiving outputs from each of the first XOR gate and the second inverter;
      a second OR gate receiving outputs from each of the second XOR gate and the first inverter;
      a first AND gate receiving the output from the first AND gate of the first circuit and an output of the first OR gate;

a second AND gate receiving the outputs from the first OR gate and the second AND gate of the first circuit;

a third AND gate receiving the output from the first AND gate of the second circuit and an output from the second OR gate;

a fourth AND gate receiving the outputs from the second OR gate and the second AND gate of the second circuit;

a first output from the first AND gate;

a second output from the second AND gate;

a third output from the third AND gate; and a fourth output from the fourth AND gate.

8. The device of claim 7, the third circuit further comprising a first diode connected between the second AND gate of the first circuit and the first inverter of the third circuit; and a second diode connected between the first AND gate of the second circuit and the second inverter of the third circuit.

9. The device of claim 7, the third circuit further comprising a third OR gate connected between the first and second AND gates of the first circuit and the first inverter of the third circuit; and a fourth OR gate connected between the first and second AND gates of the second circuit and the second inverter of the third circuit.

10. A device for routing an incoming packet to a destination, the device comprising at least one circuit for determining a next hop to a destination, the at least one circuit associated with at least three inputs, the device comprising:

an input circuit block with three inputs, the input circuit block configured to:

receive a first server input and a second server input, each server input representing a possible next hop to the destination;

receive one hash input; and determine a server output for each server input, where when both server inputs are negative, both server outputs are negative, when one server input is negative and the other server input is positive, the server output corresponding to each server input matches the state of that input, and when both server inputs are positive, determine that one server output is negative and one server output is positive based upon the state of the hash bit, where the server outputs reverse polarity depending upon the polarity of the hash input.

11. The device of claim 10, further configured wherein when all server inputs are positive, toggling the hash input distributes positive outputs evenly across server outputs.

12. The device of claim 10, the device further comprising at least one decision block comprising a circuit configured to receive the server outputs and the hash inputs from two input circuit blocks; and configured to:

determine a server output for each input circuit block server output and all hash inputs, where zero or one server output from each input circuit block can be positive, and the server outputs represent half the remaining positive input circuit block server outputs.

13. The device of claim 12, further configured wherein when all server inputs to the input circuit blocks are positive, all logical binary combinations of the hash inputs will distribute positive input circuit block server inputs evenly across decision block server outputs.

14. The device of claim 12, the device further comprising at least one output block comprising a circuit configured to receive the server outputs and hash inputs from at least two intermediate blocks, where the quantity of intermediate blocks is equal to a power of two, the at least two intermediate blocks comprising at least two decision blocks or at least two output blocks; the output block configured to:

determine an output block server output for each received server output and all received hash inputs, where the output block server outputs represent half the remaining positive intermediate block server outputs.

15. The device of claim 14, further configured wherein when all server inputs to the input circuit blocks are positive, all logical binary combinations of the hash inputs will distribute positive input circuit block server inputs evenly across output block server outputs.

* * * * *